United States Patent
Stadtfeld et al.

(10) Patent No.: US 7,462,092 B2
(45) Date of Patent: Dec. 9, 2008

(54) METHOD OF FINISHING BEVEL GEARS TO PRODUCE A DIFFUSE SURFACE STRUCTURE

(75) Inventors: Hermann J. Stadtfeld, Webster, NY (US); Uwe Gaiser, Ostfildern (DE)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 11/900,752

(22) Filed: Sep. 13, 2007

(65) Prior Publication Data
US 2008/0070484 A1  Mar. 20, 2008

Related U.S. Application Data

(60) Provisional application No. 60/845,734, filed on Sep. 19, 2006.

(51) Int. Cl.
*B24B 49/00* (2006.01)
(52) U.S. Cl. .......................... 451/11; 451/47; 451/147; 451/215; 451/219
(58) Field of Classification Search ............... 451/10, 451/11, 47, 147, 213, 215, 219, 253, 900
See application file for complete search history.

(56) References Cited

U.S. PATENT DOCUMENTS

| 3,127,709 | A |   | 4/1964  | Waguri |
|-----------|---|---|---------|--------|
| 3,584,488 | A | * | 6/1971  | Erdelyi ..................... 72/73 |
| 3,916,569 | A | * | 11/1975 | Wydler et al. .............. 451/5 |
| 4,467,568 | A | * | 8/1984  | Bloch et al. .............. 451/24 |
| 4,955,163 | A | * | 9/1990  | Sommer .................. 451/47 |
| 4,981,402 | A |   | 1/1991  | Krenzer et al. |
| 5,961,260 | A |   | 10/1999 | Kasler et al. |
| 6,481,307 | B1|   | 11/2002 | Klingelnberg |
| 6,712,566 | B2|   | 3/2004  | Stadtfeld et al. |
| 6,752,695 | B2| * | 6/2004  | Schmid ................... 451/47 |
| 2005/0266774 | A1 | | 12/2005 | Baldeck |

FOREIGN PATENT DOCUMENTS

DE  3826029  1/1990

* cited by examiner

*Primary Examiner*—Eileen P. Morgan
(74) *Attorney, Agent, or Firm*—Robert L. McDowell

(57) ABSTRACT

A method for providing a surface structure wherein conventional grinding micro scratches are broken up to provide a diffuse structure of micro scratches and micro flats resulting from grinding wheel motion comprising an eccentric revolving of the grinding wheel and/or grinding wheel pulsing.

20 Claims, 4 Drawing Sheets

Frequency-Amplitude contents
of Single Flank Error
(FFT of Single Flank Error)

(conventional-no revolving grinding wheel or pulsing)

(with revolving grinding wheel and pulsing)

1... Tooth mesh frequency
2... 2x tooth mesh frequency
3... 3x tooth mesh frequency

METHOD OF FINISHING BEVEL GEARS TO PRODUCE A DIFFUSE SURFACE STRUCTURE

This application claims the benefit of U.S. Provisional Patent Application No. 60/845,734 filed Sep. 19, 2006, the entire disclosure of which is hereby incorporated by reference.

FIELD OF THE INVENTION

The present invention is directed to the manufacture of bevel gears and in particular to a finishing process for bevel gears.

BACKGROUND OF THE INVENTION

In the production of gears, especially bevel gears, two types of processes are commonly employed, face milling (intermittent indexing) processes and face hobbing (continuous indexing) processes.

In face milling processes, tooth slots are formed individually in succession by feeding a rotating tool into a workpiece to a predetermined depth, withdrawing the tool, and indexing the workpiece to the next tooth slot position. The steps of feeding, withdrawing and indexing are repeated until all tooth slots are formed. This type of face milling process is known as a non-generating process. The profile shape of a tooth on a workpiece is produced directly from the profile shape on the tool.

Alternative to non-generated face milling, a face milling generating process may be performed wherein once the tool is fed to a predetermined depth, the tool and workpiece are then rolled together in a predetermined relative rolling motion, known as the generating roll, as though the workpiece were rotating in mesh with a theoretical generating gear, the teeth of the theoretical generating gear being represented by the stock removing surfaces of the tool. The profile shape of the tooth is formed by relative motion of the tool and workpiece during the generating roll. The steps of feeding, rolling, withdrawing and indexing are repeated for each tooth slot until all tooth slots are formed.

In face hobbing processes (non-generated or generated), the tool and workpiece rotate in a timed relationship and the tool is fed to depth thereby forming all tooth slots in a single plunge of the tool. After full depth is reached, a generating roll may be performed.

Since there is no indexing rotation of the workpiece during a face milling process, the rotating tool produces a circular lengthwise tooth curvature on the workpiece. In contrast, due to the additional rotation of the workpiece during face hobbing, a lengthwise tooth curvature having the form of an epicycloid is produced. Therefore, in a finishing process such as grinding, a circular (e.g. cup-shaped) grinding wheel is suitable for finishing the teeth of a workpiece that have been formed by a non-generated or generated face milling process but is usually not considered suitable for finishing face hobbed (epicycloid) teeth. Face hobbed gears are generally finished by a lapping process wherein the members of a gear pair (i.e. ring gear and pinion) are rotated together in the presence of an abrasive compound or slurry.

As mentioned above, face milled bevel gears may undergo a finishing process subsequent to cutting. Usually the finishing process is grinding utilizing a cup shaped grinding wheel. The type of grinding process (i.e. generating or non-generating) is usually the same as the type of face milling process utilized in cutting the gear. If desired during the grinding process, the axis of the grinding wheel may be revolved about an eccentric axis spaced from and parallel to the axis of the grinding wheel in manner as disclosed in U.S. Pat. No. 3,127,709. Such a method effectively provides an oscillating motion of the grinding wheel between adjacent tooth surfaces thereby enhancing the access of coolant to the grinding zone and the removal of chips therefrom.

Grinding of bevel and hypoid gears may cause a tooth surface roughness structure with lines of fine scratches that extend parallel to the root portion of the tooth. Imperfections of those lines often repeat on successive teeth which leads to a magnification of the amplitudes of the tooth mesh frequency and their higher harmonics. This phenomenon is known in grinding and in some applications has led to additional finishing operations, such as honing in cylindrical gears or short term lapping of bevel gears for example.

SUMMARY OF THE INVENTION

The present inventive method provides a surface structure wherein conventional grinding micro scratches are broken up to provide a diffuse structure of micro scratches and micro flats resulting from grinding wheel motion comprising an eccentric revolving of the grinding wheel and/or grinding wheel pulsing.

DETAILED DESCRIPTION OF THE PREFERRED EMBODIMENT

Figure 1:
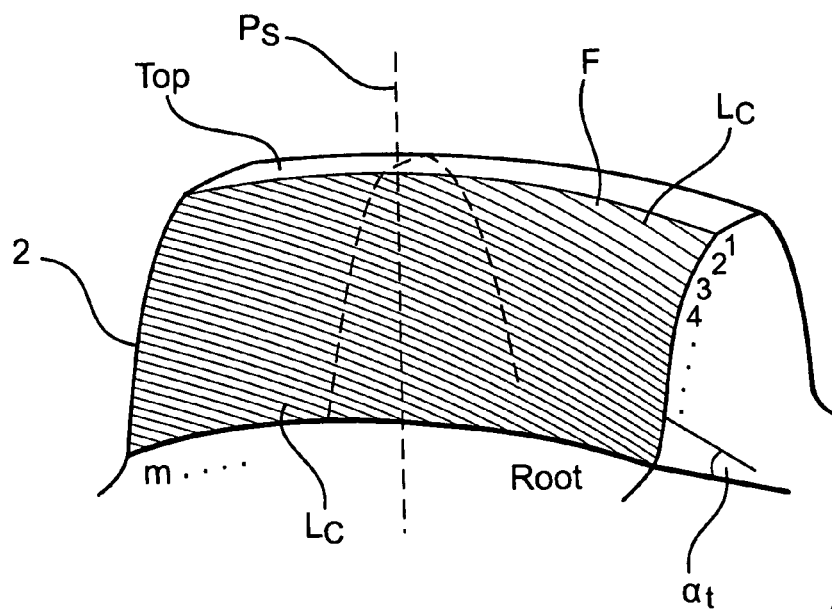
FIG. 1 illustrates the contact lines on a conventionally generated tooth surface.

The details of the present invention will now be discussed with reference to the accompanying drawings which illustrate the present invention by way of example only. In the drawings, similar features or components will be referred to by like reference numbers.

In the context of the present invention, the term "bevel" gears is understood to be of sufficient scope to include those types of gears known as bevel gears, "hypoid" gears, as well as those gears known as "crown" or "face" gears.

Generating grinding for bevel ring gears or pinions presents the grinding wheel as a tooth of the theoretical generating gear, while the workpiece rolls on the generating gear tooth to finish the profile and lead of the workpiece tooth surface. During the generating roll, a computer controlled (e.g. CNC) free form machine, of the types disclosed in U.S. Pat. Nos. 4,981,402; 5,961,260 or 6,712,566 (all incorporated herein by reference) for example, changes its axes positions in several hundred steps with each step represented by up to three linear axis positions (e.g. X, Y, Z) and up to three rotational axis positions (e.g. tool, workpiece, pivot) of the machine. In generating grinding of bevel and hypoid gears, commonly five axes are required (the grinding wheel rotates independently), which change their axis positions several hundred times during the rolling process for each tooth surface.

Figure 4:
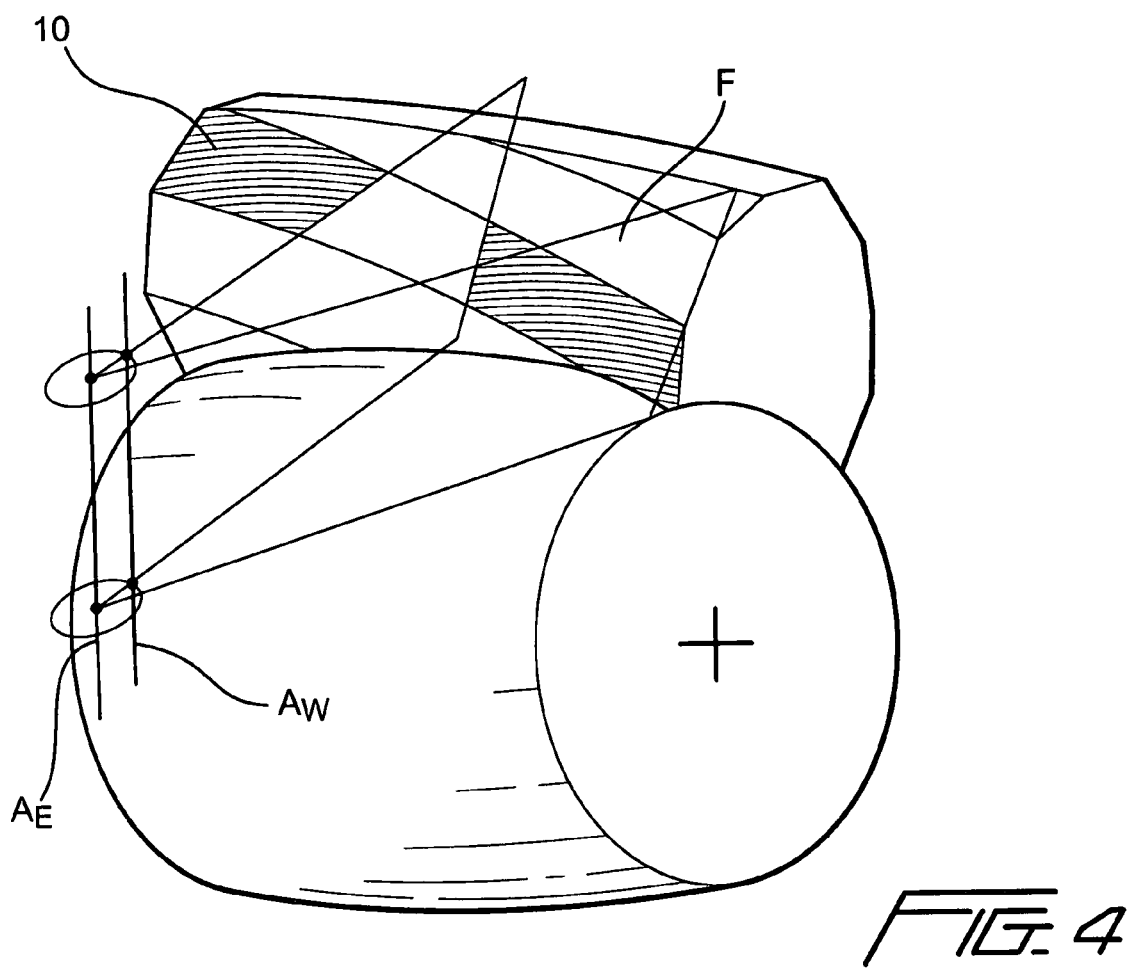
FIG. 4 is an enlarged view of a "flat" on the surface of a gear tooth.

FIG. 1 illustrates an example of the contact between a grinding wheel and a tooth surface 2 in a generating process. As mentioned above, during the generating process, the positions of the machine axes are usually changed several hundred times during grinding of a tooth surface as the grinding wheel is traversed across the tooth surface during the generating roll. Each positional change may be represented by a contact line $L_c$ with the lines of contact being oriented at an inclination angle $\alpha_r$. The number of contact lines m (i.e. the number of axes positional changes) per each generating roll position may vary but for discussion purposes only, 300 contact lines will be referenced although it should be understood that fewer of more lines of contact may be utilized. The area F between successive lines of contact shall be referred to as a "flat". Thus, for a generating roll consisting of 300 lines of contact, 299 flats will be generated. In practice, the flats of ground gears are extremely small (referred to as micro flats) and are usually not visible to the eye due to the grinding wheel surface effectively being a continuum surface with no discreet and defined cutting surfaces as would be found in a cutting tool having cutter blades. The surface structure is one of fine scratches that extend parallel to the root portion of the tooth. These scratches, referred to as micro scratches, are usually not visible to the eye but can be detected with a microscope and appropriate lighting. Grinding micro scratches 10 are illustrated in the enlarged view presented by FIG. 4.

Figure 2:
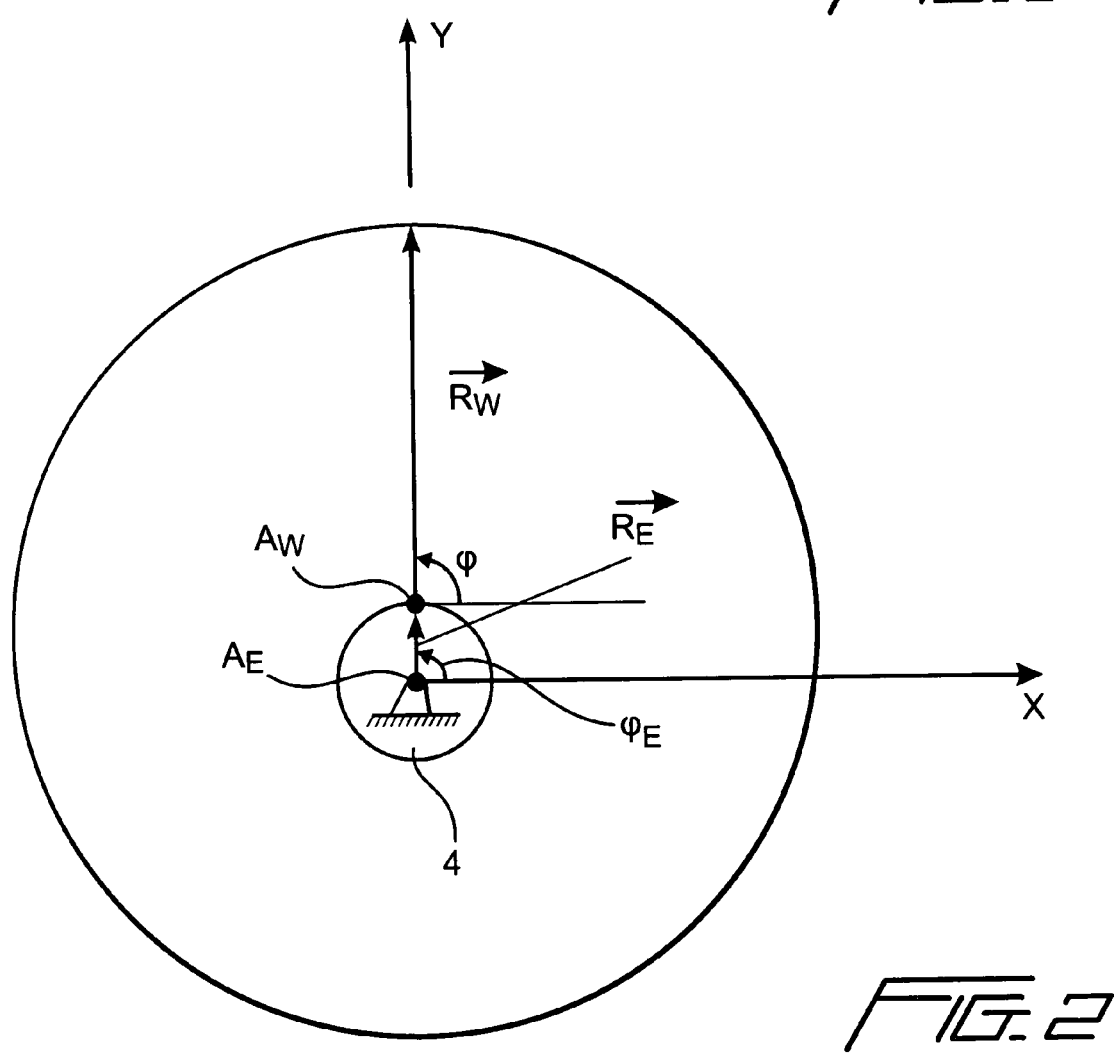
FIG. 2 shows the motion of a grinding wheel axis revolving about an eccentric axis.
Figure 3:
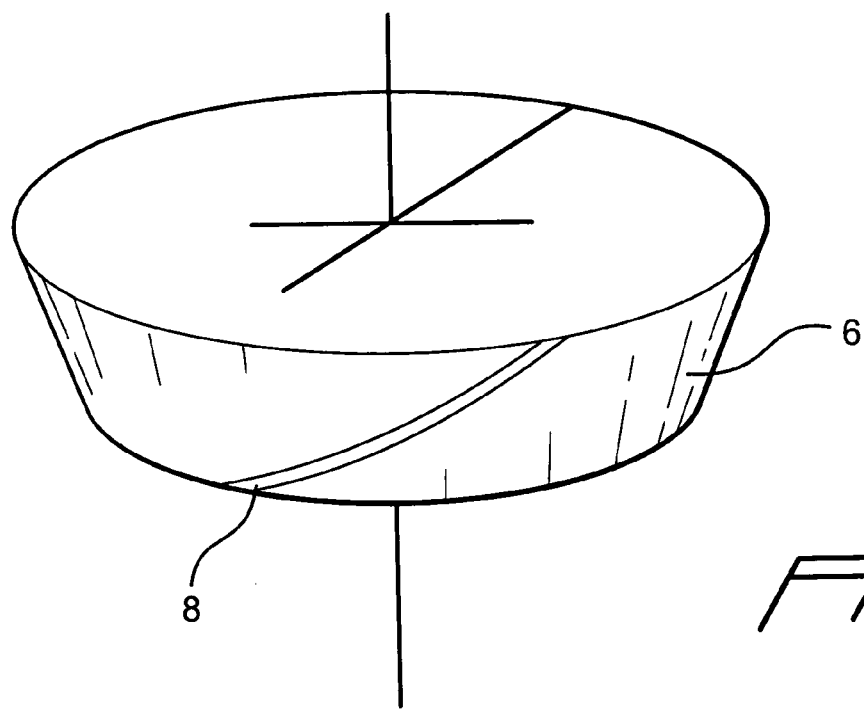
FIG. 3 illustrates the generating reference surface of a grinding wheel to be a cone surface.

FIG. 2 illustrates the previously mentioned grinding method wherein the axis of a grinding wheel, $A_W$, is revolved (circular path 4), via an eccentric spindle, about an eccentric axis, $A_E$, spaced from and parallel to the grinding wheel axis $A_W$. The generating reference surface of the grinding wheel is a generating cone 6 (FIG. 3) and the revolving of the grinding wheel axis $A_W$ along path 4 generates a modification to the flats F as the grinding wheel and workpiece roll together during generating. Each flat F (shown enlarged in FIG. 4) is generated in one machine axes position which the machine holds for a predetermined amount of time, for example, 3 milliseconds (0.003 second). In FIG. 3, a cone envelope function 8 for one flat is illustrated.

The inventive modification from one flat to the next is a sideways shift of the generating cone 6 superimposed with an equidistant displacement. A sideways shift is defined as a shift in root line direction (longitudinal tooth direction of the workpiece) shown as direction x in FIG. 2. An equidistant shift (shown as direction y in FIG. 2) is defined as being generally perpendicular to the tooth profile symmetry line $P_S$. Both directions lie in a plane (defined by the plane of the page of FIG. 2) which has the grinding wheel axis $A_W$ as a normal vector.

For grinding, the grinding wheel surface is considered to be a continuum and the movement of the grinding wheel in the plane x-y (FIG. 2) provides for the modification of the grinding flats. The grinding flat modifications due to the revolving grinding wheel axis can be split into two components:

1. sideways—which shall be referred to as "flat surface offset" (FSO), and
2. equidistant—which shall be referred to as "flat relief/advance" (FRA).

The above two components may be defined as:

$$\Delta FSO(t) = R_E \left[ \cos(\varphi_E) - \cos\left(\varphi_E + \frac{2\pi n}{60} \cdot t\right) \right] \quad (1)$$

$$\Delta FRA(t) = R_E \left[ \sin(\varphi_E) - \sin\left(\varphi_E + \frac{2\pi n}{60} \cdot t\right) \right] \quad (2)$$

where:
n=RPM, e.g. between 1000/min. and 2000/min.;
t=time in generating process from one flat to the next, e.g. 300 axes positions=299 flats→t=1/299=0.0033 seconds;
$R_E$=radius of eccentric circle, e.g. 0.06 mm;
$\phi_E$=angle of rotation about eccentric axis $A_E$.

For $\phi_E$ between 0° and 360°, the above formulas (1) and (2) may be solved for:

| $\phi_E$ | n | t |
|---|---|---|
| 0° | 1000 | 0.0033 |
| 90° | 1000 | 0.0033 |
| 180° | 1000 | 0.0033 |
| 270° | 1000 | 0.0033 |
| 0° | 2000 | 0.0033 |
| 90° | 2000 | 0.0033 |
| 180° | 2000 | 0.0033 |
| 270° | 2000 | 0.0033 |

Solving Equations (1) and (2) for the above data provides the magnitudes of modifications (sideways and equidistant) between which modifications are possible. For example, with 1000 RPM and t=0.0033 sec., modifications of 0.022 mm (max.) and 0.004 mm (min.) are possible in both directions, ΔFSO and ΔFRA.

In addition to the above modifications, the grinding wheel may also be pulsed by changing one or more axes (up to 6 axes) with the frequency (f) of the machine axis position commands. For example: f=1/t; t=1 sec/299 flats=0.0033 sec. The frequency can also be lower (e.g. every second or third position command) but not higher. The principle of the modification is to take one axis position command which can be understood as follows.

Each line of contact is defined by a plurality of machine axis positions (e.g., five axes) which together form a position command for the grinding wheel relative to a workpiece. Therefore, for 300 lines of contact, 300 position commands are required. This may be thought of as a table comprising 300 lines of code with each line representing a position command. Taking one axis position command (i.e. one line), the position command may be modified by adding a linear or angular dimension (e.g. 2 microns or 3 angular seconds) to one of the linear or angular dimensions (e.g. machine Z-axis (linear) or B-axis (pivot)) in a free form machine. The next line of positions may be used to subtract the same amount previously added from the same axis designation.

The numbers added and subtracted can also follow a linear or higher order function or can be random numbers. This has to occur within certain limits, to limit the change from flat-to-flat below a predetermined amount, for example 5 microns and to limit the change between the extreme changes (e.g. first and last flat) below a predetermined amount, for example, 5 microns, to assure trueness of flank form and preserve the effect of a noise optimal surface structure.

Figure 5:
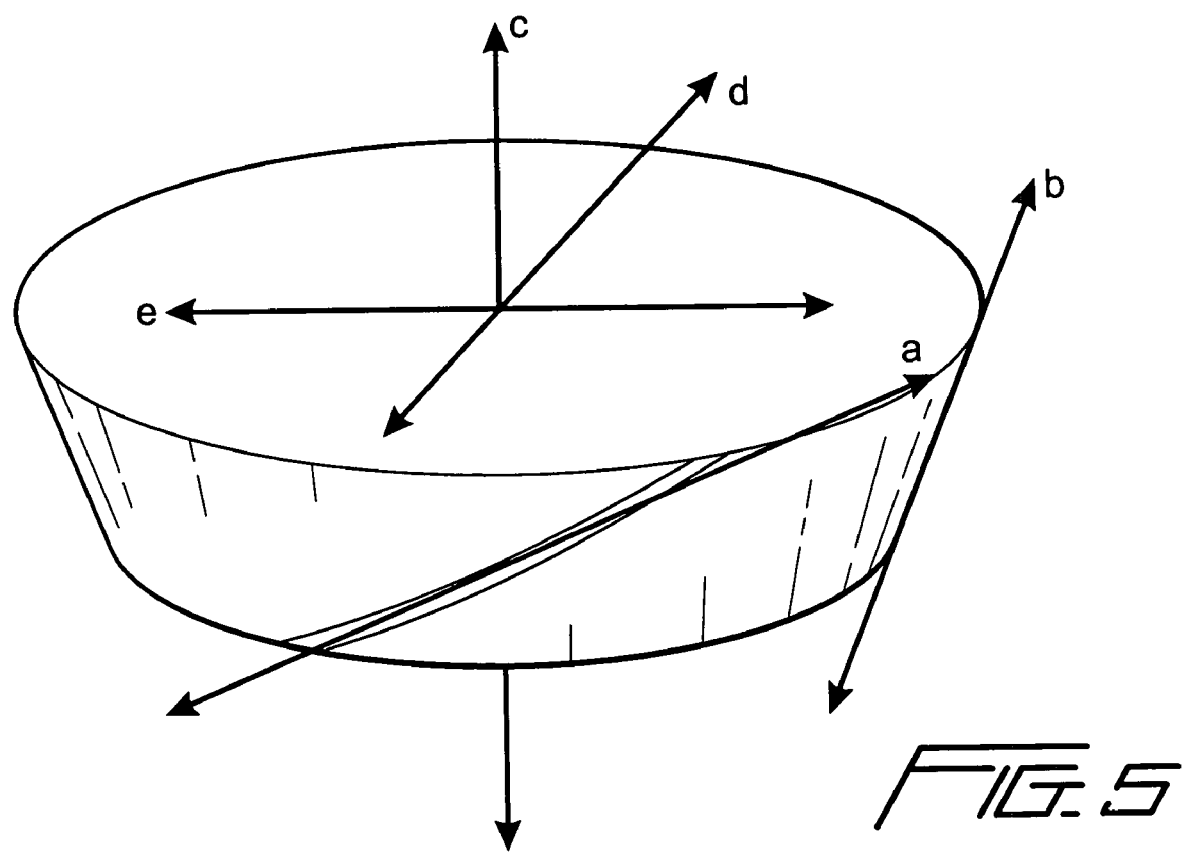
FIG. 5 show directions for pulsing the grinding wheel in accordance with the invention.

Preferred vector directions for pulsing include (see FIG. 5):
(a) tangential to the flat;
(b) tangential to the grinding wheel cone (in axial plane);
(c) axial movement;
(d) radial movement normal to flat;
(e) radial movement tangential to flat;
(f) combination of a, b, c, d and e, combination can change from flat to flat;
(g) single movement a through e but changing from flat to flat;
(h) combination movement similar to f but changing quantity of movement from flat to flat;
(i) single axis movement with changing quantity from flat to flat, axis designation can also change from flat to flat.

The axis movement (pulsing) is a superimposition of delta values to the theoretical axis positions.

Figure 6:
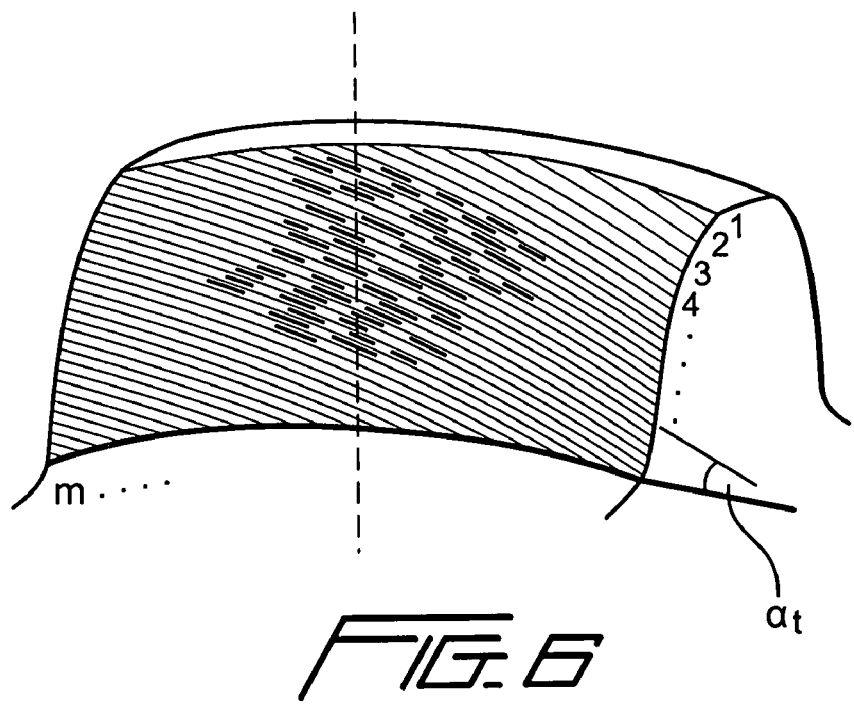
FIG. 6 illustrates an inventive ground surface having a diffuse structure of micro flats and scratches.

Practical grinding trials have shown that in comparison to a conventional ground flank surface, having invisible grinding flats and a surface structure of grinding micro scratches that extend parallel to the root portion of the tooth, the present inventive method provides a surface structure wherein the grinding micro scratches are broken up to provide a diffuse structure similar to honing and micro flats become visible due to the eccentric revolving grinding wheel and/or the axis pulsing as is illustrated, for example, in FIG. 6.

Figure 7:
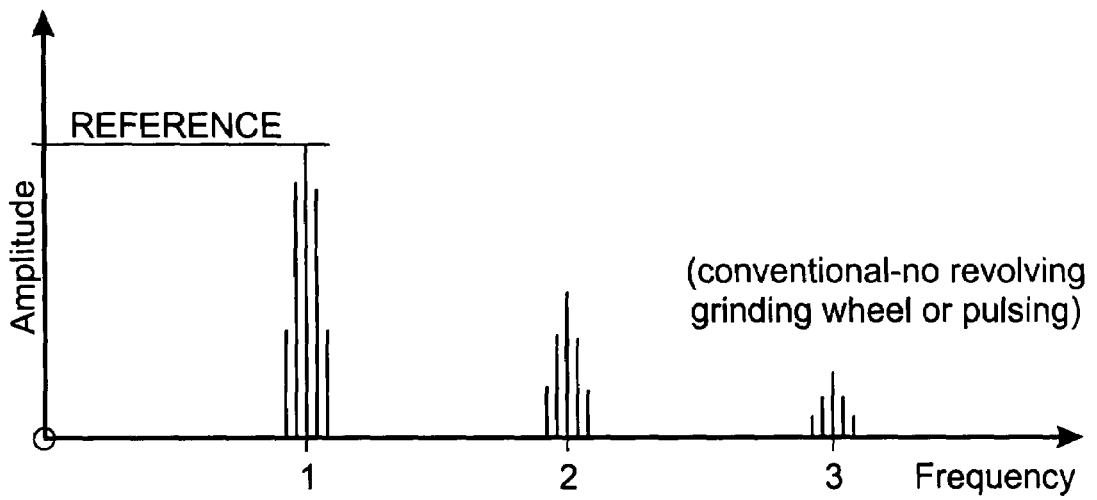
FIG. 7 is a frequency analysis comparing conventional ground gears to gears ground according to the inventive method.
Figure 7:
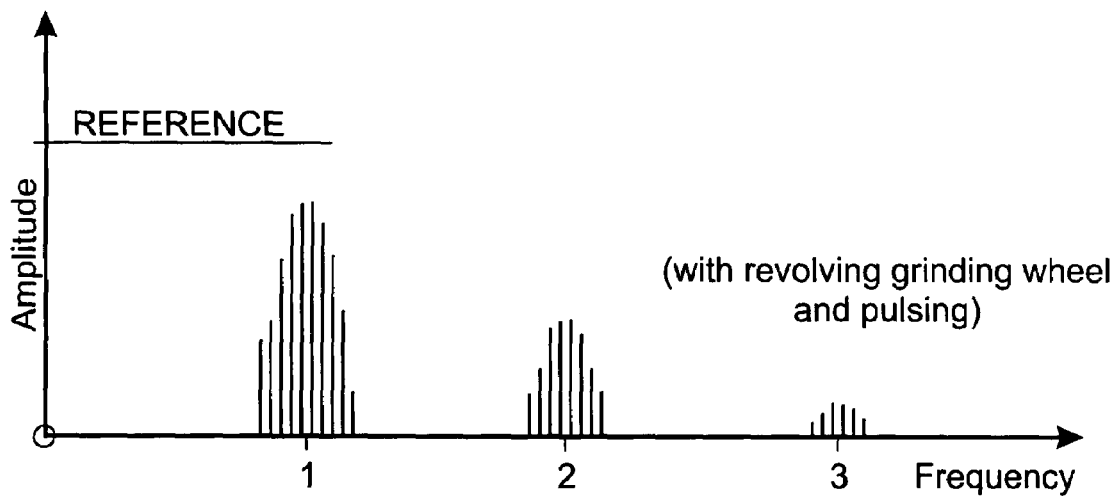

Similar to the advantages of a honed surface, the frequency analysis (FIG. 7) of gear sets manufactured according to the inventive method show lower amplitude peaks at the tooth mesh frequency and their higher harmonics. In addition, higher side bands are generated which imbed the harmonic frequency peaks and result in quieter running gears (without an additional honing operation). Vehicle sound measurements of gear sets manufactured according to the inventive method show lower levels of sound pressure (dbA). This results in gear sets with better sound quality which are easier and more stable to manufacture. Hydrodynamic lubrication and efficiency are also improved due to the inventive surface structure. This in turn reduces manufacturing costs and increases gear quality.

The preferred mesh combination is an inventive structure ground pinion and a conventionally ground ring gear (generated or non-generated ring gear). In the case of generated ring gears, the inventive structure grinding of both pinion and ring gear members may be carried out with the same or different eccentric revolving and pulsing parameters and can be chosen so as to reduce noise excitation events.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of grinding at least one tooth flank of a bevel gear with a grinding tool rotatable about a tool axis of a gear grinding machine having a plurality of machine axes, said method comprising:
    rotating said tool and bringing said tool and said at least one tooth flank into engagement;
    providing relative movement between said tool and said gear to traverse said tool across said at least one tooth flank in accordance with a predetermined relative rolling motion, said rolling motion comprising a plurality of contact lines between said tool and said at least one tooth flank thereby producing a predetermined number of grinding flats and a plurality of grinding scratches on said at least one tooth surface;
    simultaneously with said generating roll, revolving said tool axis about an eccentric axis spaced from said tool axis, whereby a grinding tool generating cone is formed;
    shifting the generating cone surface to introduce grinding flat modifications to at least one grinding flat during the predetermined relative rolling motion, said shifting comprising a shift in a direction of the root line of said at least one tooth flank and a shift in a direction generally perpendicular to the tooth profile symmetry line of said at least one tooth flank.

2. The grinding method of claim 1 wherein each of said contact lines is defined by a plurality of axes positions of said grinding machine, said method further comprising:
    pulsing said tool simultaneously with said shifting, said pulsing occurring for at least one of said contact lines and being effected by modifying one or more of said plurality of axes positions for the respective said at least one of said contact lines.

3. The method of claim 1 wherein said shift in a direction of the root line of said at least one tooth flank and said shift in a direction generally perpendicular to the tooth profile symmetry line of said at least one tooth flank are defined, respectively, by:

$$\Delta FSO(t) = R_E\left[\cos(\varphi_E) - \cos\left(\varphi_E + \frac{2\pi n}{60} \cdot t\right)\right]$$

$$\Delta FRA(t) = R_E\left[\sin(\varphi_E) - \sin\left(\varphi_E + \frac{2\pi n}{60} \cdot t\right)\right]$$

where:
    n=RPM of eccentric axis;
    t=time in generating process from one flat to the next;
    $R_E$=radius of eccentric circle;
    $\phi_E$=angle of rotation about the eccentric axis.

4. The method of claim 1 wherein said direction of the root line of said at least one tooth flank and said direction generally perpendicular to the tooth profile symmetry line of said at least one tooth flank are located in a plane, said tool axis being normal to said plane.

5. The method of claim 2 wherein said modifying one or more of said plurality of axes positions comprises adding and/or subtracting respective axis positioning units from theoretical axis positioning values.

6. The method of claim 5 wherein said adding and/or subtracting is carried out in accordance with a linear or higher order function.

7. The method of claim 5 wherein said adding and/or subtracting is carried out in a random manner.

8. The method of claim 2 wherein flat-to-flat modifications are limited to a predetermined amount.

9. The method of claim 2 wherein the first flat-to-last flat modifications are limited to a predetermined amount.

10. The method of claim 2 wherein pulsing directions are defined with respect to said generating cone vectors.

11. The method of claim 10 wherein the pulsing cone vectors extend in at least one of the following directions:
    a) tangential to a grinding flat represented on the periphery of the cone section;
    b) tangential to the peripheral surface of the cone section in the axial plane of the grinding tool;
    c) in the axial direction of said tool;
    d) radially in a direction normal to said flat;
    e) radially in a direction tangential to said flat.

12. The method according to claim 2 wherein the combination of the modified one or more axes positions changes from flat-to-flat.

13. The method according to claim 2 wherein the quantity of the modified change of the one or more axes positions changes from flat-to-flat.

14. The method of claim 1 wherein said gear is a pinion member of a bevel gear set.

15. The method of claim 1 wherein said gear is a ring gear member of a bevel gear set.

16. The method of claim 2 wherein said gear is a pinion member of a bevel gear set.

17. The method of claim 2 wherein said gear is a ring gear member of a bevel gear set.

18. The method of claim 1 wherein said method is carried out on a pinion member of a bevel gear set and a ring gear member of said bevel gear set, and wherein shifting is effected in different amounts for each of the pinion and the ring gear.

19. The method of claim 2 wherein said method is carried out on a pinion member of a bevel gear set and a ring gear member of said bevel gear set, and wherein shifting is effected in different amounts for each of the pinion and the ring gear and pulsing is effected by different axes position modifications for each of the pinion and the ring gear.

20. The method of claim 3 wherein the RPM value varies during said relative rolling motion.

* * * * *